Dec. 10, 1940. L. E. BIGELOW Re. 21,653

DEVICE FOR DRY SEPARATION OF PRECIOUS METALS FROM FINELY DIVIDED MATERIAL

Original Filed Sept. 7, 1935

INVENTOR
LEROY E. BIGELOW
BY HARRIS, KIECH, FOSTER & HARRIS
FOR THE FIRM
ATTORNEYS

Reissued Dec. 10, 1940 Re. 21,653

UNITED STATES PATENT OFFICE 21,653

DEVICE FOR DRY SEPARATION OF PRECIOUS METALS FROM FINELY DIVIDED MATERIAL

Leroy E. Bigelow, Manhattan Beach, Calif.

Original No. 2,160,822, dated June 6, 1939, Serial No. 39,595, September 7, 1935. Application for reissue July 18, 1939, Serial No. 285,074

9 Claims. (Cl. 209—131)

My invention relates to a device for the dry separation of precious metals such as gold, silver, platinum and the like from finely divided material. Without limiting this invention and setting the following forth merely as one example, I have found that my invention is well suited for the dry separation of finely divided previous metals, such as gold, from finely divided dry material, such as desert sand.

It is an object of my invention to provide a machine which will separate and remove by gravity the heavier particles of precious metals, as gold from finely divided material.

It is a further object of my invention to provide mechanism which will permit the lighter particles of precious metals, such as flour gold, to be suspended in air and electrostatically removed from such suspension.

It is another object of my invention to provide a device employing an air flotation process having a plurality of chambers, each of which has separately controlled air pressure, permitting adjustment of the rate of flow of materials through the separating device.

It is another object of my invention to provide electrostatically charged plates of a particular shape, which will aid in the separation of the relatively light precious metals from the finely divided material.

The above mentioned general objects of my invention, together with others inherent in the same, are attained by the mechanism illustrated in the following drawing, the same being preferred exemplary forms of embodiment of my invention, throughout which drawing like reference numerals indicate like parts.

Figure 1:
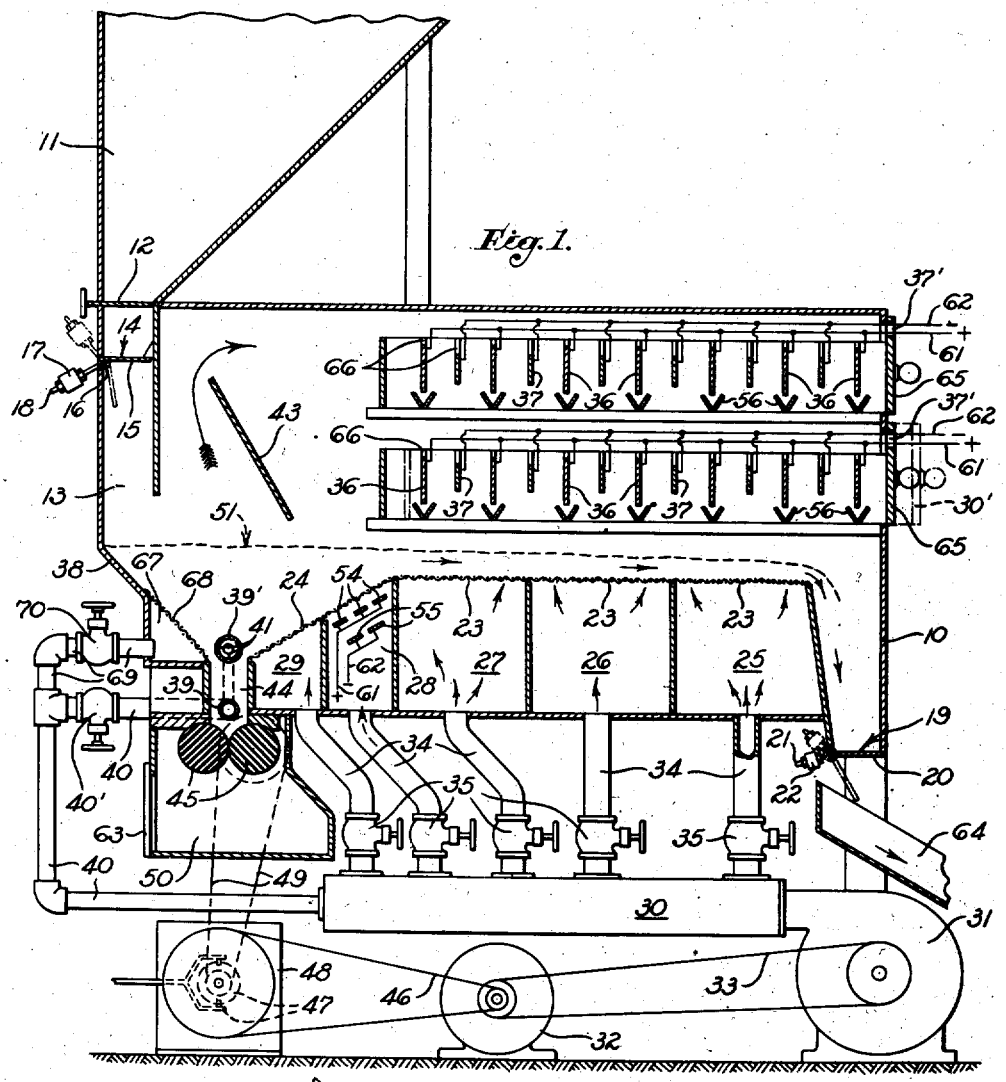
Fig. 1 is a vertical sectional view of a device embodying my invention.

In the drawing a substantially closed receptacle 10 is connected at one end with a hopper 11 and a gate valve 12 may be opened and closed to permit the material in the hopper 11 to pass downwardly in the chute 13 into the receptacle 10. A gravity closing inlet valve 14 is preferably provided which remains open as long as material is passing downwardly from the hopper 11 into the receptacle 10. The gravity closing inlet valve 14 comprises a valve member 15 supported by pivot 16 and provided with a longitudinally adjustable counterweight means 17. The counterweight means 17 is longitudinally adjusted on the lever 18, so that any appreciable weight of materials present on the gate 15 will maintain the gravity closing valve means 14 in open position. In the absence of material on the gate 15, the weight 17 moves the valve means 14 into closed position.

At the other end and on the bottom of the receptacle 10 is an outlet valve means 19. This outlet valve means 19 is also preferably a gravity closing valve and is provided with a gate 20 connected with an arm or shaft 21 and a counterweight 22 which is longitudinally adjustable on the shaft 21. The counterweight 22 may be adjusted longitudinally of the shaft 21 so that the outlet valve 19 will be maintained open with the presence of a predetermined amount of material on the gate 20. A substantially horizontal screen section 23 is provided adjacent the outlet end portion of the machine and a substantially inclined screen section 24 is provided substantially adjacent the inlet end portion of the machine.

A plurality of chambers, such as chambers 25, 26, and 27, are provided below the screen section 23. Another plurality of chambers, such as chambers 28 and 29, are provided below the inclined screen section 24. An air reservoir 30 is connected to a source of air pressure, as a blower 31, which is driven by any suitable source of power, such as an electric motor 32 and belt means 33. The reservoir 30 is connected by separate conduits 34, each of which is provided with a separately adjustable valve means 35, with the chambers 25 to 29 inclusive. For purposes hereinafter discussed, by the adjustment of a valve 35, any desired pressure may be created in the chambers 25 to 29, inclusive. The screen sections 23 and 24, which form the upper surface of the chambers 25 to 29, inclusive, are of a sufficiently fine mesh to prevent the passage of material downwardly therethrough into the chambers 25 to 29, inclusive. In providing such screen for relatively fine material, I have taken a 500 mesh screen of approximately $\frac{1}{32}$ inch thickness and rolled said screen to provide smaller openings in the screen. After the screen was rolled, it is believed that the openings in such a screen were of a size approximately equal to the openings in a 750 mesh screen. For coarser material, a coarser screen may be used. The purpose of providing relatively fine openings in the screen sections 23 and 24 is to prevent material passing downwardly therethrough and at the same time to provide openings which will permit the desired air pressure in the chambers 25 to 29 to be maintained. I have found in operation that pressures ranging up to twenty pounds are necessary for different types of material in the respective chambers 25 to 29, inclusive.

The relatively light precious metals, such as flour gold, is recovered in what may be termed an "air flotation zone" in the upper portion of the receptacle 10 above the screen section 23. The effect of the air breaking through the blanket of material from below is to form a cloud of air-borne finely divided material, and a feature of my invention is that I provide electrostatically charged plates, as indicated by numerals 36 and 37, in the air flotation zone for extracting values from this cloud. To favor air currents in the air flotation zone for carrying the finely divided material into the region of the electrostatically charged plates 36 and 37, I provide one or more air flotation outlets 37' in the end of the receptacle 10 well above the outlet valve means 19. In the particular embodiment being described two such openings 37' are shown on two levels corresponding to two horizontal series of the electrosatically charged plates 36 and 37.

The end wall 38 of the receptacle 10 is preferably inclined at an angle of substantially 45°. The lower end of the inclined wall 38 is in spaced relation to the lower end of the inclined screen section 24 providing between said members a discharge outlet chamber or trap 44 for heavy particles of material. Preferably a plurality of air conduits, such as conduits 39 and 39', are provided in the discharge outlet chamber 44. The air conduit 39 is preferably positioned near the lower end of the chamber 44 and the air conduit 39' is preferably positioned adjacent the upper opening of the chamber 44. Conduit means 40 connects the air conduits 39 and 39' with the air reservoir 30. A valve 40' is provided in the conduit 40 for adjusting the air pressure to the conduits 39 and 39'. The air conduit 39' is preferably provided with downwardly and horiontally directed openings 41. The air conduit 39 is preferably provided with angularly positioned openings 42 which are directed downwardly and outwardly.

Figure 4:
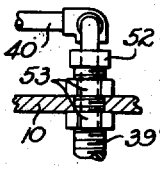
Fig. 4 is a detached fragmentary plan view of parts of the air blast means.

In Fig. 4 I have shown a fragmentary plan view of the conduit 39' and the means connecting the same to the conduit 40. A stuffing box 52 and nuts 53 of standard construction are employed, permitting the conduit 39 to be angularly adjusted as desired, and the air-tight connection between the conduits 39' and 40 maintained.

An angularly disposed baffle plate 43 is preferably provided above the air conduit 39'.

A chamber 67 is provided adjacent the end wall 38 in communication with the interior of the machine. A screen 68 forms a continuation of the wall 38 and extends over the opening between the chamber 67 and the interior of the machine. An air pressure supply conduit 69 having a valve 70 therein is connected with the chamber 67. The conduit 69 is connected with the air reservoir 30, preferably by connecting said conduit 69 with the conduit 40 between the valve 40' and said air reservoir.

As material passes from the hopper 11 past the inlet valve and downwardly along the wall 38, it is affected by the air which is being discharged through the openings 41 of the conduit 39', the openings 42 of the conduit 39, and the screen 68. The finely divided material containing the precious metals is agitated by this air. The relatively heavier particles move downwardly by gravity along the wall 38 and into the chamber 44. Rotatable rubber rolls 45 serve to provide an air seal at the bottom of the chamber 44. These rolls are preferably driven at relatively slow speeds from a source of power, as the electric motor 32, by means of a belt 46, a clutch mechanism 47, a speed reduction means 48 and a belt 49. The drive means and clutch mechanism, for independently controlling the operation of the rolls 45, is only somewhat diagrammatically indicated. However, as this may be done by many well known means, it is believed that such diagrammatic indication is sufficient. The air from the conduit 39 and 39' tends to keep the finely divided material in the chamber 44 in a state of agitation permitting the heavier particles to move downwardly to the bottom of the chamber. The heavier particles pass downwardly between the rubber rolls 45 into the receptacle 50. The finer particles of metal and the finely divided materials pass upwardly to maintain the level which is indicated at 51. As the material rises, due to the action of the air from the conduits 39 and 39' and chamber 67, it passes in the direction of the arrow between the wall 38 and the baffle plate 43. In view of the fact that the screen section 24 and the wall 38 are inclined toward each other to form a substantially V-shaped hopper, a relatively large body of material must be maintained in agitation over said members, as compared to the amount of material which remains in agitation over the screen member 23. The air passing through the conduits 39 and 39', together with the air passing through the screen sections 24 and 68, is sufficient to maintain the material in agitation above said screen section 24 and said wall 38.

The particles of metals which are of a size smaller than the size of particles which have been separated out, and which ran down the wall 38 into the chamber 44, move with the material in the substantially V-shaped hopper in a substantially rotary direction. These particles are deposited on the screen section 24 and graduate in size, the heavier being deposited on the screen section directly above the chamber 29, while the lighter are deposited on the screen section 24 above the chamber 28. Also due to the agitation of the material directly above the screen section 24, these particles are separated out by gravity and work down the screen section 24 into the chamber 44 and thence are delivered through the rolls 45 into the chamber 50

It is to be noted from the foregoing description that the screen bottom or perforate supporting means for the material in the machine is of broken configuration in longitudinal section and includes both a depression for trapping relatively heavy particles and a sloping portion for accumulating particles of intermediate size.

Figure 2:
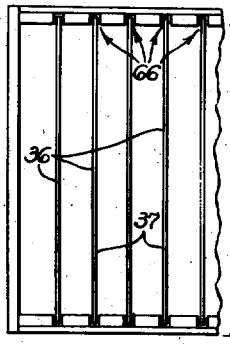
Fig. 2 is a detached fragmentary plan view of a tray and a plurality of electrostatically charged plate members.
Figure 3:
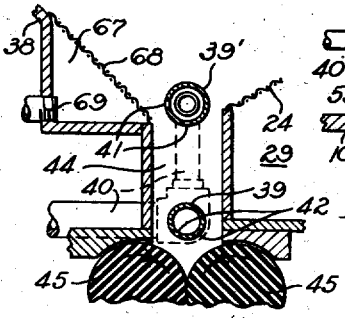
Fig. 3 is a detached fragmentary sectional view on a larger scale of parts of the air blast means.

Electrostatically charged plates are also used to complete the separation of the metallic substances from the finely divided material. The electrostatically charged plates 36 and 37, which are positioned above the screen section 23, and which are shown in plan in Fig. 2, together with the electrostatically charged plates 54 and 55, which are present in the chamber 28, are spaced apart from approximately ½" to 2" depending upon the class of material in the machine. The plates 36 and 54 are the positive plates, while the plates 37 and 55 are the negative plates. It is desirable that as high a voltage of direct current be impressed on these plates as may be done without the electrical energy arcing from one plate to the other. In view of the fact that such information is well known in the electrical art, I will not set forth complete data relative to spacing and strength of voltage. However, I prefer to use a voltage of at least 2,000 volts—the exact voltage depending upon the spacing between the plates. For convenience, alternating current may be rectified by well known means, and the resulting pulsating current of the desired voltage, having a relatively low amperage, is very satisfactory and suitable for impressing a voltage on the said plates. As relatively high voltage electrical energy is discharged between the plates 55 and 54 (without arcing, as above indicated), the positive plates 54 tend to electrostatically attract non-magnetic, as well as magnetic metals toward said positive plates. This force attracting the non-magnetic precious metals toward the plates 54 tends to maintain the same against the inclined screen section 24. In view of the fact that the openings in the screen are small, relatively fine particles of precious metals cannot pass therethrough. The presence of the electrostatically charged plates 54 at this position serves as means to prevent the precious metals of a size larger than flour gold from moving with the finely divided materials toward the discharge end of the machine.

Thus far, the heavier and relatively lighter particles of metals have been separated out of the mass of finely divided material. In some desert sand, a great amount of values in the form of flour gold are found. A certain amount of these values will be in the finely divided material as it passes over the screen section 23. As such values pass over this screen section 23 the air passing upwardly through said screen will carry the said values upwardly into the field of the plates 36 and 37. Also the air which raised the particles of such finely divided precious metal adjacent the baffle 43, raised this finely divided metal or flour gold into the field of the plates 36 and 37. The plates 36, being positively charged, will electrostatically attract the flour gold to said plates. Preferably the plates 36 are coated with mercury, and the flour gold will amalgamate with said mercury and the flour gold can be recovered from said amalgamation by any well known means.

Figure 5:
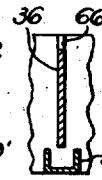
Fig. 5 is a fragmentary sectional view of a modified form of trough means positioned below the electrostatically charged plates.
Figure 6:
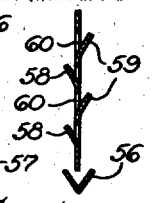
Fig. 6 is a detached fragmentary sectional view of a modified form of electrostatically charged plate.

Also preferably trough-like members 56 are supported below the plates 23. In Fig. 5 of the drawing I have shown an alternative shape of trough which is numbered 57. In Fig. 6, I have shown an alternative form of plate which may be substituted for the plate 36. This plate shown in Fig. 6 is provided with integral inclined sections 58 and 59 formed by punching out sections of the metal of the plate in alternate directions, leaving openings 60. Material, passing from an upper portion toward a lower portion of the plate shown in Fig. 6, will be directed by the inclined sections 58 and 59 and may pass alternately from one side of said plate to the other and ultimately from the lower edge of said plate into the trough-like member 56. This particularly shaped plate seems to aid in retaining the flour gold on the plates.

A source of electrical energy for charging the plates 54, 55, 36 and 37 is indicated by means of conductors 61 and 62 connected to a source of energy (not shown). The conductors 61 connect the positive plates to such a source of electrical energy, and the conductors 62 connect the negative plates to such a source of electrical energy.

For convenience in operation, preferably a door 63 is provided so that the values recovered in the chamber 50 may be conveniently removed. To obtain the values which are recovered by the plates 36, it is preferable that the plates be of such construction that they may be readily removed from the machine. This may be done by mounting the plates 36 and 37 in trays 65, which trays are slidable into and out of the machine. The plates 36 and 37 preferably slide vertically into slots 66, which are provided at spaced intervals in the sides of the trays, whereby plates may be readily removed from the trays individually. It will be noted that the flotation outlets 37' are provided in the trays 65 and that the rate of discharge of flotation air may be increased by pulling out either or both of the trays to a slight extent as indicated in dotted lines at 30' in Fig. 1.

After the plates are removed from the machine, the values, which are in the troughs 56, may be readily recovered and the values which have collected on the plates 36 may be removed by scraping the plates. In the event that mercury has been used, the amalgam containing such values may be scraped from the plates. The concentrates thus recovered from the plates 36, the troughs 56 and from the chamber 50 may be further refined by well known apparatus.

In the operation of the apparatus described, the finely divided material, which may be as above indicated, desert sand or artificially produced finely divided material, is placed in the hopper 11 and permitted to discharge from said hopper past the gate valve 12 and past the gravity closing intake valve 14. When such finely divided material enters the relatively closed receptacle 10, it is agitated by the air until the same substantially assumes the level indicated at 51. As the supply of material is increased, the gravity closing discharge means will open, due to the presence of material thereon, and as the agitated mass of finely divided material attempts to seek its own level, it discharges from the gravity actuated discharge valve means 19, and out the chute 64. To increase the rate of discharge of the material it is only necessary to adjust an individual valve means 35 of a chamber 25, 26 or 27. As the pressure in said chambers is increased, the rate of discharge of the material is thereby accelerated. The pressure necessary in the respective chambers depends upon the rate of separation. Should it be found that any values are present in the material as it leaves the discharge chute 64, the individual valves 35 should be adjusted to decrease the rate of flow of material through the receptacle. By providing individual valve control means for each of the receptacles, I provide a means for readily adjusting the rate of flow of the material through the receptacle, which rate should be determined to be the maximum rate of flow possible with a maximum recovery of the precious metals. In the event that finely divided material, having a high percentage of relatively fine or flour gold, is being run through the machine, then the rate of flow should be less to permit all of such flour gold to be recovered by the electrostatically charged plates and to thereby provide a maximum recovery of such values. Also in the event that the material is in an extremely fine state of subdivision, the pressures in the chambers 25, 26 and 27 below the screen section 23 must be decreased and the pressures in the chambers 28 and 29 and in the conduit 39 must be relatively decreased to provide sufficient agitation of the finely divided material to effect a most efficient operation of the device.

The granular material tends to form a blanket continuously flowing toward the outlet valve means 19 because any large body of finely divided material is fluid to a degree and because the fluid character of such material in my apparatus is accentuated by continuous agitation. The compressed air under the material-supporting screen continually breaks through the blanket of material at numerous points so that the material has the appearance of boiling. Because of the "boiling" action the material of the blanket-like stream is, for the most part, at any given moment spaced slightly above the screen. In practice the apparatus is operated continuously for substantial periods, and during such periods of operation the blanket of material is continuously discharged through the outlet valve means 19 and the air-borne finely divided material from the flotation zone of the device is continuously discharged through the flotation outlets 37'. If desired, the air-borne waste material from the air flotation zone may also be released through openings provided by partially opening one or more of the trays, as heretofore mentioned.

Obviously, changes may be made in the forms, dimensions and arrangement of the parts of my invention, without departing from the principle thereof, the above setting forth only preferred forms of embodiment.

I claim as my invention:

1. A device for the dry concentration of precious metals from finely divided material, comprising a receptacle; material inlet means at one end portion of the receptacle and material outlet means at the other end portion of the receptacle; a screen like bottom of fine mesh in said receptacle supporting finely divided material and allowing the passage of air therethrough, said screen like bottom having a section upwardly inclining from the inlet end portion toward the outlet end portion, and a substantially horizontal section extending from the inclined section toward the outlet end portion; air pressure supply means operatively positioned below said screen and directing a blast of air upwardly through said screen and said material; metal plates positioned below and adjacent to said inclined screen section; and means impressing a relatively high voltage on said plates.

2. A device for the dry concentration of precious metals from finely divided material, comprising a receptacle; material inlet means at one end portion of the receptacle and material outlet means at the other end portion of the receptacle; a screen like bottom of fine mesh in said receptacle supporting finely divided material and allowing the passage of air therethrough, said screen like bottom having a section upwardly inclining from the inlet end portion toward the outlet end portion, and a substantially horizontal section extending from the inclined section toward the outlet end portion; air pressure supply means operatively positioned below said screen and directing a blast of air upwardly through said screen and said material; discharge outlet means for heavy particles of material positioned adjacent the lower end portion of the inclined screen section; air seal means operatively positioned as respects said discharge outlet means; and means positioned within said receptacle and discharging a blast of air into said discharge outlet means, whereby material will be urged against entering said outlet means.

3. A device for the dry concentration of precious metals from finely divided material, comprising a receptacle; material inlet means at one end portion of the receptacle and material outlet means at the other end portion of the receptacle; a screen like bottom of fine mesh in said receptacle supporting finely divided material and allowing the passage of air therethrough, said screen like bottom having a section upwardly inclining from the inlet end portion toward the outlet end portion, and a substantially horizontal section extending from the inclined section toward the outlet end portion; air pressure supply means operatively positioned below said screen and directing a blast of air upwardly through said screen and said material; discharge outlet means for heavy particles of material positioned adjacent the lower end portion of said inclined screen section; two driven rolls of soft rubber operatively positioned in said discharge outlet means discharging said heavy particles therefrom and maintaining a substantial air seal, and means positioned within said receptacle and discharging a blast of air into said discharge outlet means, whereby material will be urged against entering said outlet means.

4. A device for the dry concentration of precious metals from finely divided material, comprising a receptacle, material outlet means at one end portion of the receptacle; material inlet means at the other end portion of said receptacle; an inclined wall below said material inlet means; a screen like bottom of fine mesh in said receptacle supporting finely divided material and allowing the passage of air therethrough, said screen like bottom having an inclined section with its lower end positioned adjacent the lower end of said inclined wall; discharge outlet means for heavy particles of material positioned adjacent the lower end of said inclined screen section and said inclined wall; means positioned within said receptacle and discharging a blast of air at the location of said discharge outlet means; and means discharging air upwardly through said screen like bottom, whereby material will be urged against entering said outlet means.

5. A device of the character described for extracting valuable metal particles of varying size from a granular mixture of materials, comprising: a closed-in receptacle having material inlet means, material outlet means, and air flotation outlet means; a bottom wall in said receptacle for supporting material in progress from said material inlet to said material outlet, at least a portion of said bottom wall being perforate, there being an air flotation zone above said bottom wall, said bottom wall being of broken configuration in longitudinal section to form at least one trap for local accumulation of the coarser metal particles; means for maintaining air under pressure under the perforate portion of said bottom wall to cause air to stream upward therethrough to agitate the material thereon, to cause the material to travel over said bottom wall in a moving blanket toward said outlet means and to form above said blanket in said air flotation zone a cloud of the finer intermixed particles from the blanket moving to said air flotation outlet means;

electrostatic means in said air flotation zone to extract the metal particles from said cloud; and means to direct air upward through said trap, thereby agitating the material therein to permit the larger particles of metal to gravitate to the bottom of the trap.

6. A combination as set forth in claim 5 in which the bottom of said trap is sealed in part by movable means of relatively resilient material adapted to form a seal around said coarser metal particles and to carry the particles so sealed out of the trap.

7. A combination as set forth in claim 5 in which the bottom of said trap is sealed by a pair of coacting rolls of resilient material adapted to deliver accumulated metal particles from the trap.

8. A device of the character described for extracting valuable metal particles of varying size from a granular mixture of materials, comprising: a substantially closed-in receptacle having material inlet means, material outlet means, and flotation outlet means; means providing a wall in said receptacle for supporting material in progress from said material inlet means to said material outlet means, at least a portion of said wall being perforate, there being an air flotation zone in said receptacle above said wall; means for maintaining air under pressure under said perforate portion of said wall to cause air to stream upward through said perforate portion to agitate the material thereon, to cause the material to travel over said perforate portion in a moving blanket toward said material outlet means, and to form in said air flotation zone above said blanket a cloud of the finer intermixed particles from the blanket moving to said air flotation outlet means; electrostatic means in said air flotation zone to extract valuable particles from said cloud; and electrostatically charged means spaced below said material supporting wall to favor immobilization of metal particles thereon.

9. A device of the character described for extracting valuable metal particles of varying size from a granular mixture of materials, comprising: a substantially closed-in receptacle having material inlet means, material outlet means, and air flotation outlet means; means providing a wall in said receptacle for supporting material in progress from said material inlet means to said material outlet means, at least a portion of said wall sloping upward toward said material outlet means to favor accumulation of metal particles thereon, there being an air flotation zone in said receptacle above said wall; means for maintaining air under pressure under said perforate portion of said wall to cause air to stream upward through said perforate portion to agitate the material thereon, to cause the material to travel over said perforate portion in a moving blanket toward said material outlet means, and to form in said air flotation zone above said blanket a cloud of the finer intermixed particles from the blanket moving to said air flotation outlet means; electrostatic means in said air flotation zone to extract valuable particles from said cloud; and electrostatically charged means spaced below said inclined portion of the material supporting wall to immobilize said metal particles accumulated thereon.

LEROY E. BIGELOW.